(12) United States Patent
De Smet et al.

(10) Patent No.: US 11,409,156 B2
(45) Date of Patent: Aug. 9, 2022

(54) OPTICAL DEVICE WITH LIQUID CRYSTAL ALIGNMENT

(71) Applicant: Sihto N.V., Zwijnaarde (BE)

(72) Inventors: Jelle De Smet, Aalst (BE); Paul Wilfried Cecile Marchal, Ghent (BE); Peter Cirkel, Sluis (NL)

(73) Assignee: SIHTO N.V., Zwijnaarde (BE)

( * ) Notice: Subject to any disclaimer, the term of this patent is extended or adjusted under 35 U.S.C. 154(b) by 0 days.

(21) Appl. No.: 16/641,437

(22) PCT Filed: Aug. 24, 2018

(86) PCT No.: PCT/EP2018/072922
§ 371 (c)(1),
(2) Date: Feb. 24, 2020

(87) PCT Pub. No.: WO2019/038439
PCT Pub. Date: Feb. 28, 2019

(65) Prior Publication Data
US 2020/0201112 A1 Jun. 25, 2020

(30) Foreign Application Priority Data

Aug. 24, 2017 (EP) .................................. 17187777

(51) Int. Cl.
*G02F 1/1337* (2006.01)
*G02F 1/1335* (2006.01)
*G02C 7/08* (2006.01)

(52) U.S. Cl.
CPC ....... *G02F 1/133526* (2013.01); *G02C 7/083* (2013.01); *G02F 1/1337* (2013.01); *G02F 1/133742* (2021.01); *G02F 1/133746* (2021.01)

(58) Field of Classification Search
CPC .... G02F 1/133526; G02F 1/29; G02F 1/1337; G02F 1/133711; G02F 1/133723;
(Continued)

(56) References Cited

U.S. PATENT DOCUMENTS 7,728,949 B2 6/2010 Clarke et al.
9,678,395 B1 * 6/2017 Lin .................. G02F 1/133711
(Continued)

FOREIGN PATENT DOCUMENTS

EP 3255479 A1 12/2017

OTHER PUBLICATIONS

Dictionary definition of "transverse," Oxford Lexico online dictionary, downloaded from www.lexico.com/en/definition/transverse on Dec. 2, 2020. (Year: 2020).*
(Continued)

*Primary Examiner* — Angela K Davison
(74) *Attorney, Agent, or Firm* — McDonnell Boehnen Hulbert & Berghoff LLP

(57) ABSTRACT

An optical device, comprising: —a first electrode layer; —a second electrode layer provided at a distance from the first electrode layer; —the first and second electrode layer being light transmitting; wherein the optical device further comprises, in between the first and the second electrode layers: o a diffractive optical element adjacent to the first electrode layer and comprising at least one sloped surface; and o a liquid crystalline material filling a space between the sloped surface and the second electrode layer; the liquid crystalline material having a pretilt that compensates for a slope angle of the at least one sloped surface.

15 Claims, 9 Drawing Sheets

(58) Field of Classification Search
CPC ... G02F 2001/294; G02F 2001/133742; G02F 2001/133746; G02C 7/083; G02C 7/081; G02B 3/08; G02B 3/12
See application file for complete search history.

(56) References Cited

U.S. PATENT DOCUMENTS

| | | |
|---|---|---|
| 2007/0216851 A1 | 9/2007 | Matsumoto |
| 2013/0128334 A1 | 5/2013 | Stephen |
| 2015/0192781 A1 | 7/2015 | Lee |
| 2016/0259187 A1* | 9/2016 | Lee .................... G02F 1/29 |
| 2021/0103190 A1 | 4/2021 | Miyake |

OTHER PUBLICATIONS

English language translation of WO 2018016398A1, downloaded from Espacenet at https://worldwide.espacenet.com/patent/search/family/060993323/publication/WO2018016398A1?q=wo2018016398 on Dec. 3, 2020. Translation into English provided by Google Translate tool available on the website. (Year: 2016).*

International Searching Authority at European Patent Office; International Search Report for International patent application No. PCT/EP2018/072922; dated Oct. 31, 2018; 4 pages.

International Searching Authority at European Patent Office; Written Opinion for international patent application No. PCT/EP2018/072922; dated Oct. 31, 2018; 11 pages.

Stöhr, J.; et al., Microscopic Origin of Liquid Crystal Alignment on Rubbed Polymer Surfaces; Macromolecules 1998, 31, pp. 1942-1946, published on web Mar. 5, 1998.

Yaroshchuk, Oleg; et al.; Photoalignment of liquid crystals: basics and current trends; Journal of Materials Chemistry; J. Mater. Chem., 2012, 22, pp. 286-300.

Jeng, Shie-Chang; et al.; Controlling the alignment of polymide for liquid crystal devices; Chapter 5 in High Performance Polymers—Polyimides based—from Chemistry to applications; INTECH; 2012; pp. 87-104, esp 88-89 and 95.

Kooy Nazrin; et al.: A review of roll-to-roll nanoimprint lithography; Nanoscale Research Letters 2014, 9:320; pp. 1-13.

Liu, Yan Jun; et al.; Nanoimprinted ultrafine line in space nanogratings for liquid crystal alignment; IOP Publishing, Nanotechnology 23; pp. 1-6 and coversheet; published: Oct. 23, 2012.

Lin, Rongsheng; et al.; Molecular-Scale Soft Imprint Lithography for Alignment Layers in Liquid Crystal Devices; Nano Letters 2007, vol. 7, No. 6, pp. 1613-1621; published on web Jun. 23, 2007.

Wu, Wei-Yen; et al.; Controlling pre-tilt angles of liquid crystal using mixed polyimide alignment layers; Optics Express, vol. 16, No. 21; pp. 17131-17137; Oct. 13, 2008.

International Preliminary Examining Authority at European Patent Office; Written Opinion of the International Preliminary Examining Authority for international application No. PCT/EP/2018/072922; dated Sep. 6, 2019; 8 pages.

* cited by examiner

OPTICAL DEVICE WITH LIQUID CRYSTAL ALIGNMENT

FIELD OF THE INVENTION

The present disclosure relates to optical devices, in particular to optical devices comprising a liquid.

BACKGROUND OF THE INVENTION

Presbyopia is a well-known disorder in which the eye loses its ability to focus at close distance, affecting more than 2 billion patients worldwide. Classic solutions include passive lenses such as reading glasses, progressive lenses or multifocal contact lenses. However, these passive lenses typically suffer from limited field-of-view, reduced contrast or long adaptation times.

Therefore, refocusable lenses, where the focal length of, a part of, the lens can be changed have attracted much attention in this field, as they would eliminate many of the known problems. Although some opto-mechanical solutions exist, electro-optical solutions are preferred as they are easier to reconfigure, have a faster response time and are mechanically more robust. Most electro-optical solutions require a cavity filled with one or more liquids and are generally using a liquid crystal based implementation. While Liquid Crystal Display technology is very mature, finding a way to integrate a refocusable liquid crystal lens in ophthalmic lenses has proven to be difficult, mainly because of the meniscus shape ophthalmic lenses generally have.

For instance, existing refocusable liquid crystal lenses are described in U.S. Pat. No. 7,728,949. This patent discloses lenses consisting of two plastic lens halves: a first curved lens half with a diffractive/refractive optical structure and a second lens half. On both lens halves transparent electrodes are deposited. The lens halves are glued together across the entire surface, except for the area of the optical structure, with a UV curable adhesive At the location of the optical structure a liquid crystalline material fills the gap between both lens halves. In the off-state the liquid crystal has the same index of refraction as the plastic substrate of the lens halves. It then conceals the diffractive/refractive structure and there is no lens action. By applying an electrical field between the lens halves, the index of refraction of the liquid crystalline material is modulated and it becomes different from the underlying diffractive/refractive optical structure, thereby leading to lens action.

The above approach, where the liquid crystal lens is directly made on two relatively thick (>1 mm) lens halves has a series of disadvantages. It is very difficult to manufacture in large volume because a conformal deposition of the electrode layer onto the curved surface of the diffractive/refractive optical structure is difficult to realize and may lead to yield an reliability issues. Obtaining a cost-effective and esthetically clean seal using a state-of-the art one-drop fill process is difficult to realize in ultra-thin lenses hence impeding high volume production of this approach. The diffractive/refractive optical structure can have a flat surface, but this limits the maximum diameter in typical thin lens designs where the flat lens needs to be somehow integrated between the curved back and front surfaces. The diffractive/refractive optical structure can be curved, but then the liquid crystal may spill over during the process, leading to contamination of the surfaces and bad adhesion of the glue. Filling the cavity post adhesion is another option but may leave the channel, through which the lens is filled, visible and compromises the aesthetics of the lens. One has to manufacture each lens blank separately, limiting the throughput.

As observed in U.S. Pat. No. 7,728,949, it is a requirement that the electro-active lens must be insensitive to the polarization of light it is meant to focus. This is however complicated by the fact that most liquid crystalline materials are birefringent and as such polarization sensitive. Two basic solutions are known: one either needs to use a multi-layered lens structure with nematic liquid crystals, e.g. two layers with orthogonal alignment for both polarizations, or to use a single layer combined with a cholesteric liquid crystal, such as proposed in U.S. Pat. No. 7,728,949. The approach makes it really hard to create a multi-layer lens structure, forcing the use cholesteric liquid crystal to build a polarization independent lens with only one layer. However, it is known for people skilled in the state of the art that it is very difficult to control the haziness of the cholesteric layers, particularly thick layers, due to disclination lines and the large internal energy of the cholesteric layers. To avoid haziness of the cholesteric liquid crystals, one has to reduce the thickness of the liquid crystal layer, but this limits the blaze height forcing the use of a shorter pitch of the blazes in the optical diffractive/refractive structure, thereby increasing chromatic aberrations.

One example of a lens structure with nematic crystals is known from US2013/0128334A1. The lens comprises liquid crystalline material between a Fresnel lens structure and a top substrate. Electrode layers below the Fresnel lens structure and on the top substrate. Furthermore, alignment layers are present on the top substrate (covering the electrode layer and facing the liquid crystalline material) and on the Fresnel lens structure. The alignment layer are typically constructed from a polyimide material, and pretreated to obtain an alignment direction, such as by rubbing. When the liquid crystals come into contact with the alignment layer, the molecules preferentially lie in the plane of the substrate and aligned in the alignment direction. As specified in relation to FIG. 6, the liquid crystalline molecules are aligned in the azimuthal direction, i.e. parallel to the alignment layer. The direction of alignment is also indicated as the pretilt. When a sufficiently strong electric field is applied over the lens, the liquid crystalline molecules will orient perpendicular to the alignment layer. The alignment of the molecules determines the overall refractive index of the material and therewith the visibility. This allows tuning of the visibility of the lens. If invisible, the overall dioptic strength will be different from the case when the lens is visible. It is observed that the structure known from US2013/0128334A1 comprises a so-called variable wavefront component (including the above mentioned lens structure) and a phase compensation component that is intended to correct phase discontinuities between wavefront portions.

As said, multi-layer lenses using planar liquid crystals in off-state may result in a polarization independent lens with less haze, but the proposed approach will lead to lenses with a large thickness and many handling issues. Particularly, when defining an optical device such that the liquid crystals lie in the planar direction when the device is off, it is desired that the Fresnel lens structure has a refractive index substantially equal to that of the molecules in the planar direction. That is typically about 1.7, whereas the refractive index in the parallel direction is about 1.5. When desiring to make a polarization independent lens based on two stacked lens structures arranged in orthogonal directions, the inventors have observed in investigations leading to the present invention, that it is rather difficult to prevent generation of ghost images. The use of homeotropic liquid crystals that are arranged in an off-stated perpendicular to the alignment direction, could be an option. However, this is problematic in that the surface of the Fresnel structure is not flat. As a consequence, liquid crystalline molecules aligning perpendicularly to the surface of the Fresnel lens obtain a variety of orientations.

SUMMARY OF THE INVENTION

Hence there is a need for an optical device with electrically tunable phase profile, e.g. a focal length change, whereby this device can be mass manufactured in with reliable optical properties.

There is furthermore a need for a polarization independent tunable lens comprising a stack of a first optical device and a second optical device, wherein the transition between a first state and a second state of different focus is well achievable and wherein appearance of double images is prevented or at least considerably suppressed.

There is also a need of an eyeglass lens comprising such a polarization independent tunable lens.

There is furthermore a need of a method of manufacturing such an optical device, and/or a stack of a first and a second optical device comprised in a polarization independent tunable lens.

According to a first aspect, the invention relates to a polarization independent tunable lens comprising a first optical device and a second optical device, wherein the first optical device comprises a first electrode layer and a second electrode layer provided at a distance from the first electrode layer, wherein the first and second electrode layer are light transmitting. The first optical device further comprises, in between the first and the second electrode layers a diffractive optical structure adjacent to the first electrode layer and being a Fresnel lens structure comprising a first sloped surface in a center of the Fresnel lens structure, which is surrounded by a plurality of angular, further sloped surfaces. These first and further sloped surfaces each have at least one slope angle relative to the first electrode layer and are covered with a first alignment layer. A further alignment layer is arranged at a side of the space adjacent to the second electrode. A liquid crystalline material fills a space between the alignment layers at least one sloped surface and at the second electrode layer and comprising liquid crystalline (LC) molecules that are vertically aligned in an off-state of the first optical device. According to the invention, the LC-molecules have been pre-treated to apply a pretilt (α) in a single alignment direction, which pretilt (α) is larger than said slope angle corresponding to a location of the respective LC molecule on the sloped surface and therewith compensates for a slope angle of the at least one sloped surface by orienting said LC-molecules to align, in an on-state, such that projections (Npxy) on the first electrode layer of the LC molecules in the liquid crystalline material include an angle transverse to the alignment direction within a range (θ) of 60 degrees.

According to a further aspect, a eyeglass lens comprising the tunable lens of the invention is provided.

According to again a further aspect, a method of manufacturing a polarization independent tunable lens comprising a stack of a first and a second optical device is provided, comprising the application of a pretilt in a single alignment direction, which pretilt (α) is larger than said slope angle corresponding to a location of the respective LC molecule on the sloped surface and therewith compensates for a slope angle of the at least one sloped surface by orienting said LC-molecules to align, in an on-state, such that projections (Npxy) on the first electrode layer of the LC molecules in the liquid crystalline material include an angle transverse to the alignment direction within a range (θ) of 60 degrees. The tunable lens is more particularly that of the invention.

The inventors of the present invention have observed that the use of homeotropic liquid crystalline material is feasible to achieve a polarization independent tunable lens, notwithstanding the sloped surfaces of the Fresnel lens structure on top of which the liquid crystalline material is applied. In order to prevent artefacts, a pretilt may be applied. However, just a pretilt does not prevent the generation of double images. Such double images are caused by disclinations, i.e. orientation of LC molecules—with their inherent dipoles— in an undesired direction. Generally, this leads thereto that the LC molecules are locally not aligned in the alignment direction, but bend into the opposite direction. A disclination in the on-state can moreover be seen as a local twist through the liquid crystal from the first to the further alignment layer, wherein the effective orientation parallel to the first electrode layer changes with the distance to the first alignment layer: a rotation occurs. When however applying a pretilt that is larger than a slope angle of the sloped surface (on which an LC molecule is present), and moreover in such a manner that the projected transverse angle to the alignment direction is not too large, then the issue is sufficiently suppressed. Any disclination that still occurs is found outside the center and rather towards the edge. Moreover, when stacking two identical optical devices to arrive at a polarisation independent tunable lens, the risk that such disclination in one optical device is amplified by the other optical device becomes rather small.

By compensating for the slope angle of the at least one sloped surface in the alignment direction, a majority of such disclinations are avoided. The LC molecules tend to orient in a predetermined alignment direction since the slope is compensated. This significantly decreases the optical failures and improves the optical reliability of the device. It is observed for clarity that the at least one sloped surface is sloped relative to at least the first electrode layer. For a spherical sloped surface, the slope angle will be largest at the edge with the first electrode layer. The tilt angle is defined relative to a normal of a location of an LC molecule on the sloped surface, and is an applied tilt angle due to the pretreatment of the alignment layer. The orientation of a liquid crystalline molecule normal to the first electrode layer is also specified as the absolute tilt angle β, and is the combination of the slope angle and the applied pretilt angle α. A projection of the absolute tilt angle β on the first electrode layer includes a transverse angle θ to the alignment direction smaller than 60 degrees. Since the pretilt is defined in the alignment direction, the slope angle is also defined in the alignment direction. As will be understood with reference to the figures, the transverse angle θ smaller than 60 degrees relative to the alignment direction, has thus a value between −60 and +60 degrees.

Preferably, said pretilt compensates for the slope by the pretilt being chosen such that projections on the first electrode layer of the molecules in the liquid crystalline material lay within a range of 45 degrees from the alignment direction, more preferably within a range of 30 degrees from the alignment direction. The said ranges define absolute angles, hence the range of up to 60 degrees runs from −60 to +60 degrees relative to the alignment direction. More preferably, the latter is measured in an off state of the optical device. This means that when the LC molecules align vertically, their vector shows a vertical component as well as a component in the alignment direction, and a component perpendicular to the alignment direction. This component in the alignment direction is, at least in a preferred embodiment, larger than the perpendicular component such that a projection of the molecules lay within the above mentioned range from the alignment direction.

The alignment direction defines the intended orientation of the majority of the molecules upon activating an electric field. However, whether the molecules orient in this direction is related to their orientation with respect to the electrode layers. Therefore, when a projection is made of the molecules on the first electrode layer, it can be determined that the molecules orient in the desired direction when the projection lies within the above mentioned range from the alignment direction. When this condition is fulfilled, the molecules will tend to orient in the alignment direction when the field is activated. This gives a predictable and therefore reliable reaction of the molecules so that the desired optical effects can be reached.

In a preferred embodiment, the LC molecules on such single sloped surface are given a uniform pretilt. It is observed that the sloped surface at the center of the Fresnel lens structure may have a smaller (maximum) slope angle than any of the angular sloped surfaces circumferential thereto. Therefore, the pretilt angle may be larger for such angular sloped surfaces than for the center. Still, in one further embodiment, the pretilt is substantially uniform over the optical device. Providing a substantially constant pretilt angle is fairly easy to realize and to control. It is observed that the said slope angle is measured in a plane comprising the alignment direction and a direction perpendicular to the first electrode layer.

Alternatively, it is possible to selectively tune the pretilt angles depending on the position on the optical device (e.g., using a photosensitive material). In one further embodiment, it may be ensured that the absolute tilt angle—the orientation of the LC molecules relative to the planar first electrode layer) is the same across the device within a margin of tolerance. To alter the pretilt, one may for instance increase the intensity at which the surface is rubbed (Stohr et al, 'Microscopic Origin of Liquid Crystal Alignment on Rubbed Polymer Surfaces') or use photosensitive alignment materials (Yaroshchuk et al, 'Photoalignment of liquid crystals: basics and current trends').

The skilled person will realize that when Fresnel-like diffractive structures are provided as in the invention, sloped surfaces are alternated with connecting surfaces interconnecting adjacent sloped surfaces. The connecting surfaces are oriented substantially perpendicular to the sloped surfaces or substantially perpendicular to the electrode layers. As such, such a connecting surface constitutes—with the connecting surface an upstanding structure known as a blaze.

When an alignment layer extends on such connecting surfaces and is pretreated to provide a pretilt to the LC molecules, the LC molecules may obtain an orientation in the off-state substantially parallel to the first electrode layer. The effect hereof is considered to be of minor influence. However, in one advantageous embodiment, the first alignment layer may be applied according to a predefined pattern, such that such connecting surfaces up to the tip of the blaze remains free of alignment layer. The patterned application of the first alignment layer, typically based on polyimide, may be effected by means of inkjet printing, screen printing, the use of a photolithographic mask (either before or after the application of a polyimide layer), and/or the coating with a photosensitive polyimide layer and subsequent irradiation (with UV) and removal of the non-cured portions of the layer.

According to a further implementation, the Fresnel lens structure is provided with a first and a second segment, wherein the pretilt ($\alpha$) in the first segment is smaller than that in the second segment. The segments are suitably arranged such that the slope angle of the one or more sloped surfaces in the first segment is smaller than at least one slope angle of the one or more sloped surfaces in the second segment. The segments may be applied for instance as strips or as rings. Herewith, the difference in slope angle can be compensated, such that the absolute tilt angle $\beta$ will be uniform for the optical device within a margin of tolerance.

In another embodiment, the alignment layer on a sloped surface is segmented in at least one inner segment and outer segments, said segments being aligned with the said alignment direction, wherein the outer segments have a pretilt angle $\alpha$ larger than that of the at least one inner segment. In this more specific embodiment, not just the alignment layer is pretreated differently in the different segments, but separate alignment layers are applied.

Preferably, the diffractive optical structure has an ellipsoid shape such that said at least one sloped surface comprises sloped surface segments having opposing slope orientations. The ellipsoid shape is often used for optical purposes and creates opposing sloped surfaces such that without pretilt compensation, the LC molecules would inevitably orient in opposing directions thereby creating the above-described disclinations. Preferably, when using an ellipsoid shape as diffractive optical structure, the alignment direction is chosen to be parallel to the shortest axis of the ellipsoid. This implies that the pretilt is parallel to this shortest axis. In this direction, slope angles of the diffractive optical structure can be compensated with minimal pretilt. In this direction, the slopes causing disclinations are suppressed.

Preferably, the first electrode layer extends substantially parallel to the second electrode layer. Preferably, multiple spacers are provided between the sloped surface and the second electrode layer. The spacers keep the layers at a predetermined distance from each other allowing the layers to extend substantially parallel. The spacers are suitably divided over the surface area so as to provide mechanical stability without disturbance of optical performance.

In one embodiment, the second optical device of the polarization independent tunable lens is a polarizer. The resulting tunable lens can be used in sunglasses. Thereto, it is suitably assembled on a conventional sunglasses without polarizer, which sunglasses optionally are provided with a dioptric power. The polarizer will be provided in such direction that it takes account of the second orthogonal polarization direction of visible light, as well known to the skilled person.

In another and preferred embodiment, the second optical device is another lens, which influences the polarization of light in the second, orthogonal direction, relative to the first optical device. More preferably, the second optical device corresponds to the first optical device in that it comprises a combination of a Fresnel lens structure, first alignment layer, liquid crystalline material and further alignment layer between a first and a second electrode layer. Such polarization independent tunable lens is in itself again to be assembled to spectacles, preferably in between of a first and a second spectacle lens with any dioptric power as suitable. It is an advantage of the present tunable lens, that it can be configured to be invisible (zero dioptric power) in the off-state, as materials matching the refractive index of the liquid crystals in the off-state (typically 1.5) are generally available. Thus, there is merely use of electricity when actively using the lens (i.e. focusing the lens).

In an even further implementation, it is preferred that such first and second optical device are substantially or entirely identical. This facilitates manufacturing. Moreover, it is deemed preferable that the first and second optical devices are assembled in a reversed orientation, such that the second electrodes are closer to each other than the first electrodes; stated otherwise, the first electrodes are rather at the outsides of the assembly, wherein the second electrodes are in the inside of the assembly. This is found to result in the best performance when using homeotropic liquid crystalline material.

Particularly in view of the desired integration into spectacles, it is preferred that the lens as defined by the Fresnel lens structure has a diameter of 15-35 mm, such as 20-30 mm. This is a fairly wide lens. The issue leading to the present invention was particularly observed in relation to lenses with such a diameter. It will be also available at larger diameters, but the double images might then not be suppressed sufficiently.

Preferably, the first electrode layer extends substantially parallel to the second electrode layer. This is preferable so as to achieve a stable device wherein the distance between the electrodes and therefore the field strength is the same over the entire width. Moreover, such parallel extension can be achieved in that the first and the second electrode are each applied onto a substrate, and the substrates with electrode layers and any further layers (such as the Fresnel lense structure and the alignment layers) is thereafter assembled together.

In again further implementation, multiple spacers are provided between the sloped surfaces and the second electrode layer. The multiple spacers are suitably distributed so as not to disturb optical performance. The dioptric power of the polarisation independent tunable lens is suitably in the range between 0 and 4, preferably between +0.5 and +3.0, such as between +1.0 and +2.5.

The Fresnel lens structures used may be of various orders, as known to the skilled person, wherein the height of the Fresnel lens structure increases with the order. A higher order gives better optical quality, but switches slower. Furthermore, it appears that the issues with double images are more pronounced for the higher order lenses than for the lower order lenses. Third order lenses and sixth order lenses have been made.

In order to manufacture an optical device, preferably following steps are performed:

Providing a first substrate with the first electrode, the Fresnel lens structure and the first alignment layer;

Applying the pretilt to the first alignment layer in the single alignment direction;

Providing a second substrate with the second electrode and the further alignment layer, and applying a pretilt to the further alignment layer in a such direction that the pretilt is anti-parallel to the first alignment direction after assembly of the first and second substrate;

Assembling the first and the second substrate and providing liquid crystalline material, such that a space formed upon assembly between the first alignment layer and the further alignment layer is filled up with said liquid crystalline material.

It is observed for sake of clarity that pretreatment of the further alignment layer is desired so that the LC molecules are oriented into the desired orientation at the top side and at the bottom side of the space wherein the LC material is present. The resulting pretilt angle applied to the further alignment layer does not need to be equal to that applied to the first alignment layer. When the second electrode layer is planar, which is the preferred situation, the pretilt angle of the further alignment layer may be smaller than that of the first alignment layer. Suitably, the pretilt angle at the first alignment layer lies in the range of 4-8 degrees, such as 5-7 degrees, for instance about 6 degrees. It is observed for sake of clarity that the antiparallel direction of the pretilt of the further alignment layer is meant to refer to the situation in the generated device.

In again a further aspect, the invention relates to a method of manufacturing an optical device:

providing a first substrate with a light-transmitting, first electrode layer (8) and a diffractive optical structure (4) adjacent to the first electrode layer, said diffractive optical structure being a Fresnel lens structure comprising a first sloped surface (11) in a center of the Fresnel lens structure, which is surrounded by a plurality of angular, further sloped surfaces, which first and further sloped surfaces each having a slope angle relative to the first electrode layer (8);

applying at least one alignment layer on said first and further sloped surfaces, and treating said at least one alignment layer so as to apply predefined pre-tilt to liquid crystalline (LC)-molecules adjacent thereto;

providing a second substrate with a light-transmitting, second electrode layer and a further alignment layer thereon treated to apply a predefined pre-tilt to liquid crystalline (LC)-molecules adjacent thereto;

assembling the first and the second substrate, such the second electrode layer is provided at a distance (d) from the first electrode layer, with the alignment layers facing each other, and creating a space in between thereof, which is filled up with liquid crystalline material, wherein the application and/or treatment of the said at least one alignment layer is configured to provided multiple segments, which have different alignment directions and/or different pretilt angles ($\alpha$).

According to this aspect, the—first—alignment layer is subdivided into multiple segments with different alignment directions and/or different pretilt angles. Herewith the pretilt may be arranged so as to match the slope of the underlying Fresnel lens structure. This is beneficial so as to ensure that the LC molecules are all aligned properly. Suitably, it is therewith achieved that the orientation of the LC molecules in the on-state, when projected onto the first electrode layer includes a transverse angle to the alignment direction of at most 45 degrees, or even at most 30 degrees. The subdivision of the alignment layer into segments is deemed an effective method to reduce the issue of double images. Preferably, the step of providing the pretilt comprises one of rubbing the optical device in said alignment direction and/or using photosensitive alignment materials.

In a preferred embodiment hereof, a first alignment layer is provided that is treated in a first segment in a first alignment direction and in a second segment in an alignment direction that is parallel and opposite to the first alignment direction. Herein, in an even more preferable implementation, the first segment and the second segment are arranged such that the first segment covers a first part of a sloped surface that is located downstream of a center of the Fresnel lens structure in the first alignment direction, and the second segment covers a second part of the same sloped surface that is located upstream of said center in the first alignment direction. In this embodiment, the first and second segment is given an opposite alignment direction. The border between the first and the second segment, may be through the center of the Fresnel lens structure. Alternatively, such border may coincide at least partially with the transition from one sloped surface to a subsequent sloped surface. The advantage hereof is then that no line will be visible in the sloped surface in the center, which is the most dominant surface for a user. Most preferably, when subdividing the first alignment layer in segments with opposite alignment direction, corresponding segments are applied in the further alignment layer, so as to ensure matching of the alignment on the bottom and top side of the cavity filled with liquid crystalline material.

In a further implementation, such first and second segment may be divided or rather accompanied by further segments with the same alignment direction, but different pretilt angle. For instance, wherein the said first and second segment are inner segments, and that furthermore outer segments are present, adjacent to each of the first and the second segment, wherein the inner and outer segments are arranged parallel to the first alignment direction, preferably with mutual interfaces parallel to the first alignment direction, and wherein the outer segments have a different pretilt angle than the inner segment.

In another embodiment, that may be combined with the preceding embodiment, a first alignment layer is applied according to a predetermined pattern corresponding to a first segment and a second alignment layer is applied according to a predetermined pattern corresponding to a second segment, said first and second alignment layer having a distinct pretilt angle ($\alpha$). The first and the second alignment layer may herein comprise photosensitive material, which is treated by irradiation to define the pretilt angles. For instance, the doping of a polyimide with polyhedral oligomeric silsesquioxane nanoparticles may be used to generate materials with a different pretilt angle dependent on the concentration of the nanoparticles, such as disclosed by S-C Jeng et al, "*Controlling the alignment of polyimide for liquid crystal devices*" Chapter 5 in *High Performance polymers—polyimide based—from chemistry to applications* (INTECH, 2012), pages 87-104, esp 88-89 and 95. Alternatively or additionally, a first alignment layer is applied, that comprises a photosensitive material, and wherein said segments are provided by treatment of said photosensitive material, wherein the treatment for at least a first and a second of said segments is different, so as to provide mutually different pretilt angles and/or a mutually different alignment directions.

While this technology is known per se, the application in the context of the invention in combination with Fresnel lens structures to prevent or reduce the issue of double images is not known or addressed in the prior art.

In again a further embodiment, the angular sloped surfaces each extend from a blaze protruding from the first electrode layer, said blaze further having a sidewall extending substantially transversal to the first electrode layer (8), wherein the first alignment layer is provided according to a predefined pattern such that the sidewalls of the blazes are kept free and remain without alignment layer.

According to again a further aspect, the invention relates to an optical device obtainable in accordance with the method of manufacturing described hereinabove. The resulting device is an optical device provided with a first electrode layer; a second electrode layer provided at a distance (d) from the first electrode layer, which first and second electrode layer being light transmitting, and in between of which are present: a diffractive optical structure adjacent to the first electrode layer and being a Fresnel lens structure comprising a first sloped surface in a center of the Fresnel lens structure, which is surrounded by a plurality of angular, further sloped surfaces, which first and further sloped surfaces each having a slope angle relative to the first electrode layer, and are covered with a first alignment layer; liquid crystalline material filling a space between said first alignment layer on the at least one sloped surface and the second electrode layer and comprising liquid crystalline (LC)-molecules that are vertically aligned in an off state; and a further alignment layer arranged at a side of the space adjacent to the second electrode. The LC-molecules at an interface with said first alignment layer have a pretilt ($\alpha$) in a single alignment direction, wherein the first alignment layer is provided with multiple segments, so as to have different alignment direction and/or different pretilt angle. When a first and a second segment have different and opposed alignment direction, the further alignment layer is correspondingly provided with a first and second segment with opposed alignment directions.

The invention further relates to a polarization independent tunable lens comprising a stack of a first optical device and a second optical device, wherein at least the first optical device and preferably also the second optical device are in accordance with the preceding aspect, and/or obtainable in accordance with the method specified. The optical device of this aspect can be manufactured with the method of the invention and allows reduction of double image issues when applied in a polarization independent tunable lens. In one suitable embodiment, the polarization independent tunable lens is curved. Preferably, the assembly of first and second optical device are treated so as to apply a predefined curvature. More preferably, said predefined curvature matches a curvature of glasses from a spectacle into which the polarization independent tunable lens is to be integrated, for either by attachment to one side of such glass or more preferably by integration between two lens halves of such spectacle glass. It has been found that the application of curvature does not have a negative impact on the alignment properties of the LC molecules.

Using this method, an optical device can be manufactured with the reliable optical properties as described above. The skilled person will realize that the pretilt can be provided using multiple techniques and, depending on the technique used, at different stages of the manufacturing process. Any embodiment or implementation discussed hereinabove to one aspect, also applies to any other aspect, unless clearly contradicting.

BRIEF INTRODUCTION OF THE FIGURES

The invention will now be described in more details with respect to the drawings illustrating some preferred embodiments of the invention. In the drawings.

DETAILED DESCRIPTION OF ILLUSTRATED EMBODIMENTS

Figure 1:
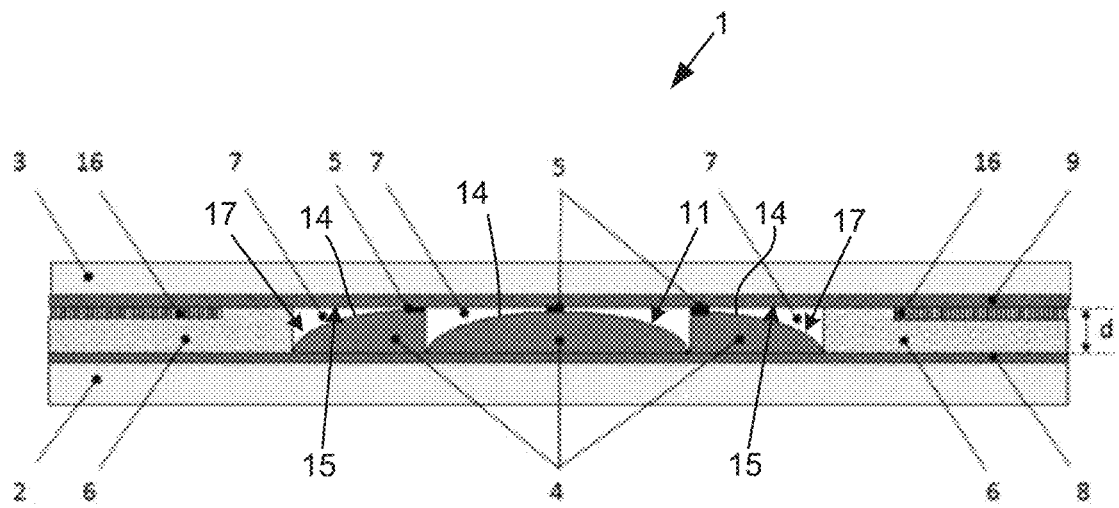
FIG. 1 shows a cross-section of an optical device according to an embodiment of the invention.

In the drawings a same reference number has been allocated to a same or analogous element.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to the present disclosure, the only relevant components of the device are A and B. The term "at least one of", used in the claims, should be interpreted as specifying the presence of one or more of the stated features, integers, steps or components as referred to, thereby replacing the expression and/or. Thus, at least one of A and B should be interpreted as A and/or B. The term "one of", used in the claims, should be interpreted as specifying the presence of a single one of the stated features, integers, steps or components as referred to, thereby replacing the expression or. Thus, one of A and B should be interpreted as A or B.

A thermoplastic, or thermosoftening plastic, is a plastic material, a polymer, that becomes pliable or moldable above a specific temperature and solidifies upon cooling. Preferably these thermoplastic layers are made from polymers which are optically transparent: i.e. having between 5 and 100% light transmission efficiency in the visual spectrum e.g. 400-700 nm. Examples are polyethylene terephthalate, cellulose triacetate, transparent polyurethane polycarbonate, or thiourethane materials used for making eyeglasses such as Mitsui MR8. The films made of these materials may have thicknesses that vary between 5 and 1000 µm and typically withstand bending radii up to 3 mm.

The diffractive optical element may comprise a diffractive structure such as blazed gratings, Fresnel lenses, Fresnel axicons or other structures which induce a predetermined phase profile in the transmitted light.

The fluid material filling the cavity 7 is a liquid crystalline material. Preferably the index of refraction of the liquid crystalline material, filling the cavity, is matched with the index of refraction of the diffractive optical element 4, the border 6 and the adhesive at least for one of the states of the liquid crystalline material. For instance, the ordinary index of the well-known liquid crystal E7 is equal to the UV glue NOA74. The liquid crystalline material is vertically aligned in the off-state. A vertically aligned liquid crystalline material is a material in which the liquid crystals naturally align vertically to an alignment surface. In other words, when no voltage is applied, in the off state of the optical device, the liquid crystals remain substantially perpendicular to the alignment surface. Such a material is also known to have a negative dielectric anisotropy (ε) and are known per se. The resulting liquid crystalline material is also referred to as homeotropic. In a lower part of the optical device, the alignment surface is mainly formed by the sloped surfaces of the diffractive structure. In an upper part of the optical device, the alignment surface is formed by the second electrode layer or the layer comprising the second electrode. The upper and lower alignment layers form the bottom and top walls from the cavity of the optical device. In an embodiment, the lower alignment surface and upper alignment surface are not parallel but show inclined segments corresponding to the sloped surfaces.

Figure 4:
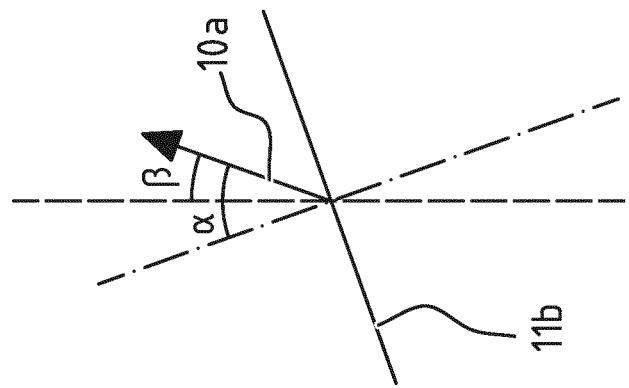
FIG. 4 illustrates the pretilt compensating the sloped surfaces.
Figure 4:
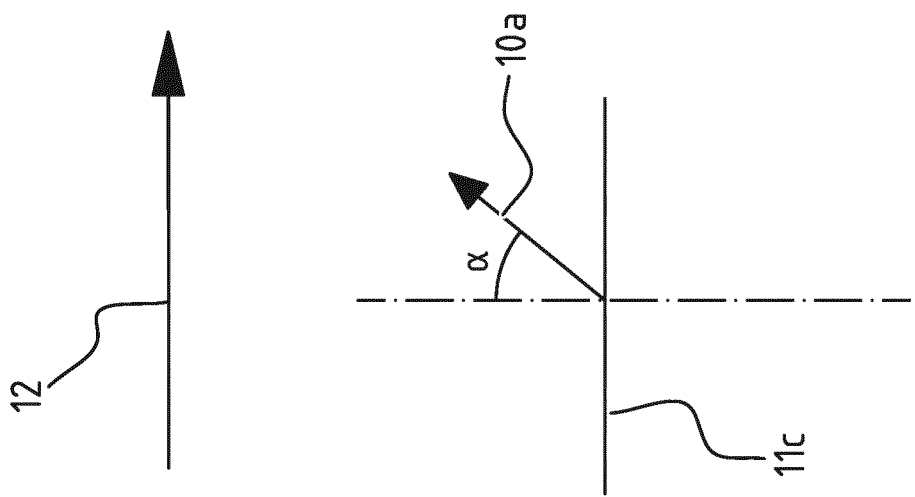
Figure 4:
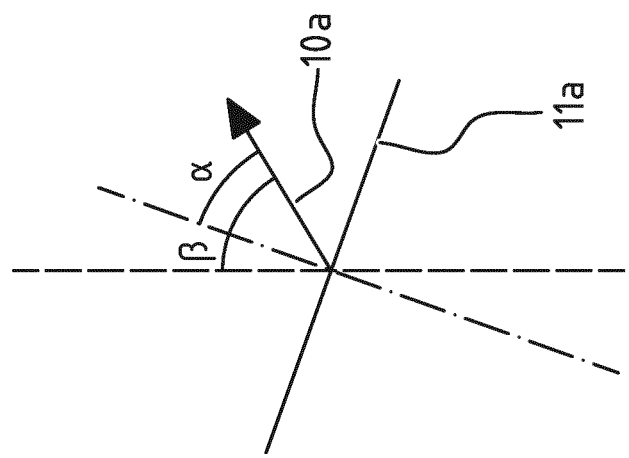

It has been observed that crystals in vertically aligned liquid crystalline materials tend to take, in their off state, the substantially perpendicular position with respect to the contacting surface, being the alignment surface, instead of with respect to the electrode layer. A consequence of this behavior in the optical device of the invention is that at least a part of the crystals take a position, in their off state, which is tilted with respect to the first electrode layer. This tilt is directly related to the slope of the at least one sloped surface in the diffractive structure. Therefore, typically, this tilt with respect to the electrode layer is discontinuous over the optical device. In the further description, the tilt of the LC molecule with respect to the normal of the first electrode layer is referred to as the effective tilt angle. In FIG. 4, the effective tilt angle is illustrated with reference indication β.

The concept of pretilt is known for LC materials. In the literature, the term pretilt can have slightly different definitions, typically depending on the circumstances. In the present disclosure, vertically aligned liquid crystalline materials are used, and the alignment layer is discontinuous showing different slope directions and/or angles with respect to the electrode layers. Pretilt is in this context defined as relating to an angle, in an off state of the device, between the LC crystals and a surface normal of an alignment material. The alignment material is the material in contact with the LC molecules. In FIG. 4, the pretilt is illustrated with reference indication α. According to this definition, it is clear that when the alignment surface is parallel to the first electrode layer, the effective tilt angle β and the pretilt a are the same. This is illustrated in FIG. 4 in the middle part of the figure. Also, according to this definition, when no pretilt is given, the LC molecules extend substantially perpendicular to the alignment surface.

Multiple techniques are described in the literature to provide a pretilt to LC molecules. Many of these techniques aim to point the LC molecules in a predetermined direction. This influences the direction to which the LC molecules orient when switching to the on state. For most optical systems, it is preferred that these LC molecules orient in a single direction. This also makes clear that the pretilt in many cases not only defines an angle, but also defines a direction in which the angle is oriented. For example, when pretilt is realized via rubbing, the rubbing direction determines the pretilt direction and the rubbing intensity determines the pretilt angle.

For completeness, the optical effects of LC materials in an optical device, including the effect called light leak, is explained. To ensure a uniform optical response for one polarisation across the whole diffractive structure, the nematic LC molecules should remain aligned uniaxially in all states. In this way, the retardation caused by the birefringent molecules will not affect the polarisation of linearly polarized light in two specific perpendicular orientations. When the phase profile of the transmitted light is then influenced by e.g. the height of the diffractive structure at various locations, it can be carefully managed to exhibit a specific behaviour such as focusing into a point. Linearly polarized light parallel to the uniaxial direction will remain linearly polarized but having a changed phase profile, while the perpendicular direction remains unaffected. An optical device with the desired response can then be constructed by either placing a linear polarizer in front of the LC cell with the correction orientation (at the cost of reduced overall light transmission), or by placing two identical cells under a 90-degree angle, leading to a polarization independent device.

However, if the molecular orientation deviates from a uniaxial configuration, for instance because of the surface of the diffractive structure, a position dependent retardation comes into effect. As a result, a position dependent change in polarisation will occur and the local phase profile will become a superposition of two states. Unlike the perfect uniaxial orientation, a linear polarizer cannot eliminate the undesired phase profile across the full device and hence a position dependent double image will come into effect. Similarly, two such identical devices would lead to position dependent double images. This effect is called light leak and is minimized by the present invention.

Preferably, the bottom substrate comprises the first optical transparent thermoplastic layer 2, and comprises a first optical transparent electrode 8. The upper substrate comprises the second optical transparent thermoplastic layer 3, and comprises the second optical transparent electrode 9. The first optical transparent electrode 8 and the second optical transparent electrode 9 are provided at a fixed distance d, preferably set by a number of a spacers 5 provided on top of the diffractive optical element 4. The distance d is preferably further maintained by the border 6. The diffractive optical element 4, spacers 5 and border 6 are positioned in between the layers 2 and 3 and in between the electrode layers 8 and 9, as illustrated by FIG. 1. The distance d can be between 10 nanometer (nm) and 100 micrometer (μm), typically between 50 nm and 50 μm.

In a preferred embodiment the border 6, the spacer 5 and the diffractive optical element 4 have the same material composition. For example, the spacer 5, the diffractive optical element 4 and the border 6 can be made from a high-refractive-index monomer such as bisphenol fluorine diacrylate or high refractive index UV-glues such as NOA 1625 or NOA 164 commercially available from Norland Products, Inc, as Norland Optical Adhesives (NOA).

As disclosed below, the border 6, the spacer 5 and the diffractive optical element 4 can be formed using nanoimprint technology from the same layer, having the above mentioned material composition, present on the bottom substrate.

Nanoimprint technology is a simpler, lower-cost and high-throughput patterning technology compared to lithographic patterning used in semiconductor and flat panel manufacturing technology. As disclosed inter alia in 'A review of roll-to-roll nanoimprint lithography', by Kooy et al in Nanoscale Research Letters 2014, hereby incorporated by reference, nanoimprint lithography involves the use of a prefabricated mold containing an inverse of the desired pattern. This mold is pressed into a polymer-coated substrate whereby the pattern is replicated into the polymer by mechanical deformation thereof. After deformation the pattern is fixed using a thermal process on the deformed polymer or by exposing the deformed polymer to UV-light resulting in a hardening of the nanoimprinted pattern. Thereafter the mold is removed. The inverse pattern can correspond to a single structure to be formed. Forming an array of structures in the polymer then requires repeating the nanoimprint process as many times as the number of structures needed. The throughput can be increased if the mold contains an array of the inverse pattern, whereby during a single nanoimprint the desired number of structures is simultaneously formed in the same polymer.

Preferably, the surface of the diffractive optical element 4, which surface is oriented towards the second thermoplastic layer 3 contains submicron grooves configured as an alignment layer for a liquid crystalline material. These grooves can be created when forming the diffractive optical element 4 by nanoimprint as discussed in the previous paragraphs. The mold used in the nanoimprint process contains not only the negative shape of the border 6, the spacer 5 and the diffractive optical element 4, but its inner surface, at least at the location of the shape of diffractive optical element 4, contains grooves in e.g. a circular or rectangular pattern. This approach allows forming these features in an integral way. Y. J. Liu et al discloses forming such alignment patterns using nanoimprint technology in 'Nanoimprinted ultrafine line and space nano-gratings for liquid crystal alignment', as does R. Lin et al. in 'Molecular-Scale Soft Imprint Lithography for Alignment'.

The alignment properties of the liquid crystalline material are not only determined by the geometry of grooves themselves, but also by the material constituting the diffractive optical element 4 in which the grooves are formed. If another material is used for the same configuration of the grooves, an additional conformal alignment layer can be formed overlying these grooves to provide different material alignment properties. For instance, a homeotropic alignment layer might be coated, overlaying at least some of the grooves if the material of the diffractive optical element aligns the liquid crystal molecules in a planar way. This conformal alignment layer can cover the complete grooved surface of the diffractive optical element 4. Alternatively only part of this grooved surface can be covered with this additional conformal alignment layer allowing to exploit the difference in material alignment properties between the additional conformal alignment layer and the diffractive optical element 4.

A layer 14 of a planarizing material can be present inside the cavity 7 on top of the diffractive optical element 4. An alignment layer may also be present at the bottom of the cavity 7, by grooves formed in the surface of the planarizing layer, which surface is oriented towards the second thermoplastic layer 3. During operation of the device 1 these grooves assist in orienting the liquid crystals present in the cavity 7. Preferably another alignment layer 15 is also present at the side of the cavity 7 adjacent to the second optical transparent electrode 3, thereby facing the grooved surface.

The materials of respectively the diffractive optical element 4 and the planarization layer, at least at their interface, can have the same refractive index Furthermore, the dielectric constant at low frequency electric fields (e.g. 1 Hz-10 kHz) of the these materials may differ. This planarizing material can also be used to form the upper part of the border 6. If a notch 16 is present, it is formed in this planarizing material.

The optical transparent electrodes can be made of materials such as Indium Tin Oxide (ITO), ClearOhm® silver nanowires or AGFA Orgacon inks. Because of the brittleness of ITO, less rigid and more flexible materials can be used such as PEDOT:PSS, graphene, carbon nanotubes or silver nanowires. The optical transparent electrodes 8, 9 can be patterned to individually address different zones of the diffractive optical element 4. These electrodes can also be patterned to reduce the overall capacity, e.g. by only having electrodes within the area of the diffractive optical element 4 or to separate the electrode within this area from electrode within the area of the border 6.

In a second aspect of this disclosure, optical devices 1 as disclosed in the previous aspect, are used in optical instruments. When inserted in an optical instrument, the optical device 1 is configured to tune the phase profile of the light towards the eye.

Such an optical instrument can be a lens, where the optical device is used as a lens insert. When considering ophthalmic applications, the lens might be an eyeglass lens, a contact lens or a intraocular lens. Since both eyeglass lenses and contact lenses generally have a meniscus shape, the optical device can be more easily integrated in the lens, when the optical device 1 is also curved with a curvature substantially the same as the curvature of the lens in which it needs to be embedded. Typically, the optical device will then be curved in two orthogonal directions. For intraocular lenses, a planar or a curved optical device can be embedded.

Figure 8:
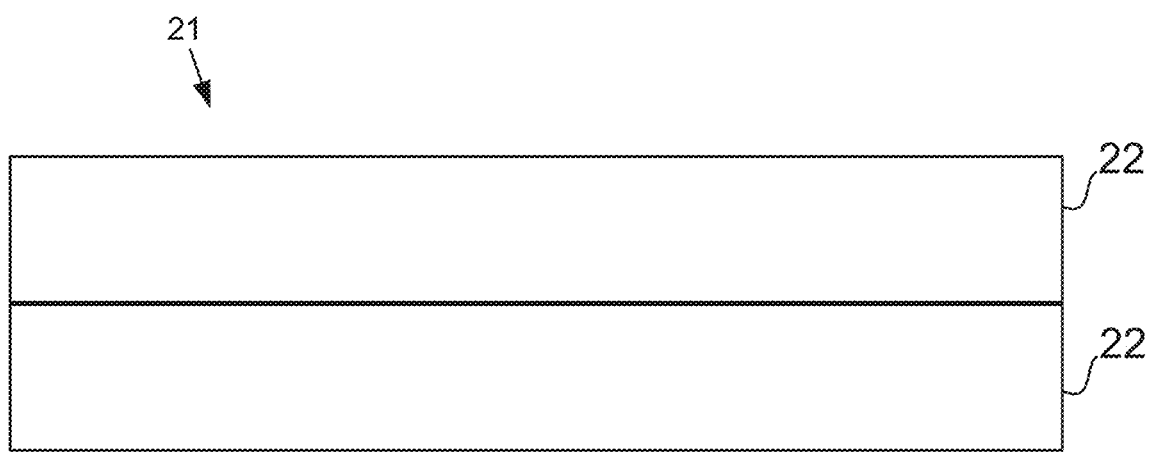
FIG. 8 shows an optical instruments with stacked optical devices.

Such optical instruments can contain more than one optical device 1. Multiple of these optical devices 1 can be stacked. By stacking multiple optical devices 1, or 22 in an optical instrument 21 shown in FIG. 8, the electro-optical properties of the single optical devices can be combined. For instance, two devices filled with nematic liquid crystal but with an orthogonal alignment can lead to a polarization independent tunable lens.

Figure 2:
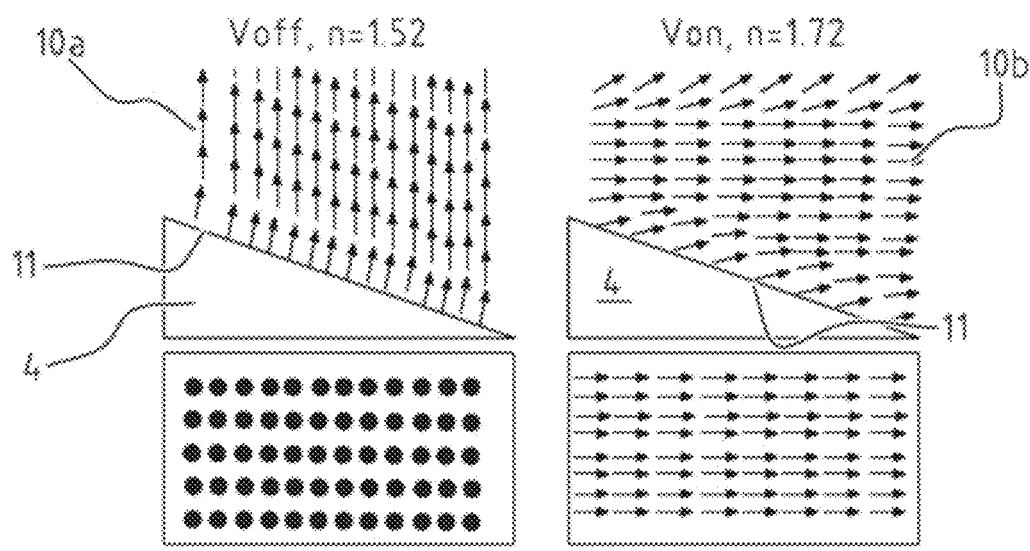
FIG. 2 shows an intended LC orientation in an on and an off state of the device.

FIG. 2 shows the intended behavior of the LC molecules 10 for creating a well controlled difference in index of refraction between the on/off state. Such controlled difference results in the desired reliable optical properties of the optical device. In the figures, LC molecules in the off state are referred to with 10a and LC molecules in the on state are referred to with 10b. In the off state, the LC molecules are vertically aligned.

The optical device comprising the LC molecules operates through a difference in index of refraction of the liquid crystal in its on and off-state. This is the result of a change in orientation of the LC molecules and unless that is carefully controlled, the lens behaves erroneously. Particularly, it is desired that the majority, preferably all of the molecules point upward in the off-state. In this state the refractive index of the liquid crystal is substantially matched with the refractive index of the resin material of the lens. This means that the ordinary refractive index, ne, of the liquid crystal mixture used is substantially the same as refractive index of the lens material. This matching is done in a sufficient way for all wavelengths of visible light. Therefore a resin material for making the lens is prepared with a refractive index dispersion curve closely resembling the dispersion curve of the liquid crystal mixture, such that the refractive index of the two does not deviate by more than 0.05.

When an electrical field is applied, it is desired that the majority of, preferably all of the LC molecules align substantially horizontally, all extending substantially parallel to a predetermined axis, more preferably pointing in substantially the same direction. In this way, there is an optical power for only one polarization and that both top and bottom alignment layer work in a coordinated fashion. In order for this optical power to be of practical use the difference in the ordinary and extra-ordinary refractive index should be sufficiently large, typically >0.15.

Figure 3:
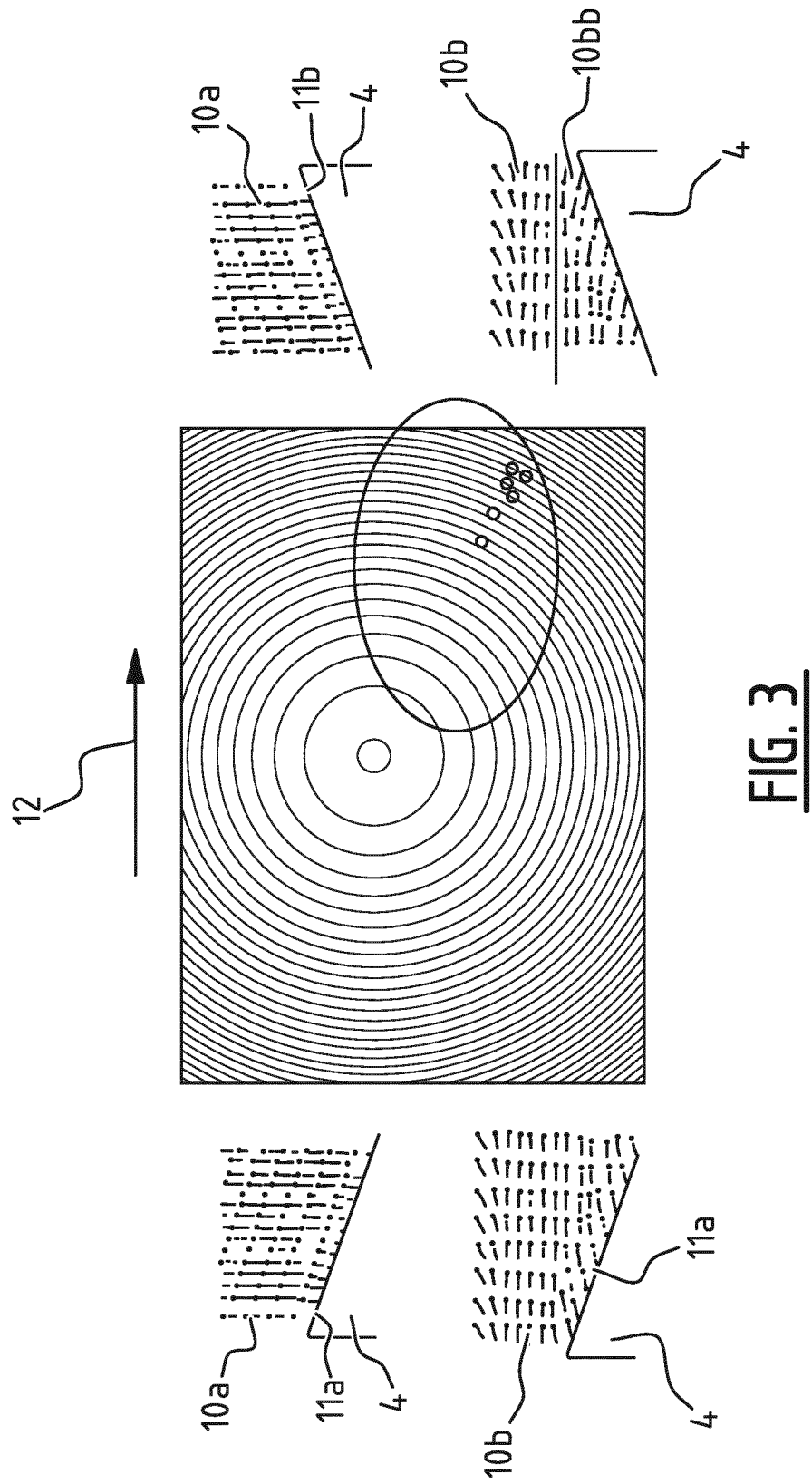
FIG. 3 illustrates the effects of an alignment direction on sloped surfaces.

FIG. 1 shows a cross-section of an optical device of the invention, and shows a typical situation wherein the diffractive structure comprises multiple sloped surfaces 11, 17 wherein the slopes have different slope directions and/or different slope angles. Fresnel lenses show a high degree of symmetry. Therefore sloped surfaces 11, 17 can have different slope angles. Sloped surfaces which are sloped in the direction of preferred alignment direction 12 are referred to with 11a. Sloped surfaces which are sloped in a direction opposite to the preferred alignment direction 12 are referred to with 11b. FIG. 4 further shows a flat surface 11c. To obtain the behavior as illustrated in FIG. 2 in an optical device with such diffractive structure, according to the invention, pretilt of the LC molecules is altered. The behavior of a LC material, without altering of the pretilt, is illustrated in FIG. 3.

The optical devices are preferably created with a preferred alignment direction 12 in the polyimide. This ensures that the power of one polarization direction of the light is focused, where the other is un-altered. This is achieved, according to an embodiment, by rubbing the polyimide layers on both lens and no lens layer surface in an anti-parallel direction. Note that other techniques achieving same result may be also used.

During testing, it was observed that this technique of creating a preferred alignment direction worked properly for lenses with low optical power. In other words, when diffractive structures with medium or low structures are used, this technique worked properly. However for higher power lenses, this resulted in a huge number of disclinations when the field is switched on.

The invention is at least partially based on the insight that the surface topography additionally tilts the LC molecules and hence, when the field is switched on, it may orient the LC-molecules (with their inherent dipoles) in opposite directions at opposing sides of the lens. This causes disclinations, particularly at the side where the LC dipoles at top and bottom surfaces are oriented in opposite directions. Such unwanted behavior is illustrated in FIG. 3, and explained with more details hereunder. This unwanted effect becomes more pronounced the higher the slope of the facets in the lens or thus the power and diameter of the lens. Note that these disclinations typically occur on the same side of the lens at the outer steepest blazes.

FIG. 3 illustrates such situation. The optical device in FIG. 3, shown in the center of the figure, is treated to have a preferred alignment direction 12 towards the right hand side of the figure. The diffractive structure in the optical device is a Fresnel lens. On the left hand side of the figure, a cross-section is shown of a slope segment 11a in the left hand side of the optical device. On the right hand side of the figure, a cross-section is shown of a further slope segment 11*b* in the right hand side of the optical device. From the figures, it is clear that these slope segments have opposing slope orientations.

FIG. 3 shows further, at both sides, an upper and a lower situation. The upper situation corresponds to the LC molecules in their upright state 10*a* while the lower situation corresponds to the LC molecules in their lying state 10*b*. The upright state is the state the LC molecules take when no significant electric field is created between the electrode layers. The lying state is the state the LC molecules take when a predetermined electric field is created between the electrode layers.

As a result of the preferred alignment direction, as is illustrated in FIG. 3, the majority of the LC molecules tend to orient to the right in the lying state 10*b*. However the slope angle at the right hand side of the figure inflicts the LC molecules that are located in a proximity of the slope surface to orient to the left, illustrated with reference number 10*bb*. The figure at the right hand side and lower situation illustrates that part of the LC molecules are directed to the left 10*bb* while another part of the LC molecules are directed to the right 10*b*. In this context, it is noted that this is an abstract extension of the alignment of the molecules at the sides of the cavity into the bulk LC cell. In general, the bulk molecules will exhibit an additional twist to compensate for the orientational mismatch in the bulk of the cell. This disturbs the light transmitted through the LC molecules so that optical errors are visible in the optical device.

To address this issue, the pretilt a of the LC material with respect to the surface of the alignment material is altered to compensate the tilt set by the surface topography. This pretilt is a known property of a LC material, expressing the angle $\alpha$ between LC molecules and the surface normal of the alignment material 11. For simplicity, one can understand that if one can increase the pretilt of the LC more than the slope, all LC-molecules will orient in the same direction and the intended alignment behavior can be achieved. This is illustrated in FIG. 4. FIG. 4 illustrates the principles of pretilt. The figure shows the angle $\alpha$ between the surface normal and the LC molecule on surfaces with different slope angles.

From FIG. 4, it is clear that the pretilt can be chosen such that the absolute tilt, in the figures illustrated with angle $\beta$, of the LC molecules 10*a*, corresponds with the preferred alignment direction 12. In other words, substantially all LC molecules 10*a* are oriented, in the upright state, to have the same direction of absolute tilt $\beta$. To achieve this, the pretilt is chosen to have an angle $\alpha$ larger than the steepest opposing inclined surface angle. This is illustrated in the right hand part of FIG. 4, which sloped surface 11*b* has a surface normal showing an angle with respect to the upright axis in the opposite direction compared to the pretilt direction. The pretilt angle $\alpha$ is larger than the angle between the surface normal and the upright direction such that the resulting absolute tilt $\beta$ is in the desired direction. When the LC molecules are activated by switching on the electric field, all LC molecules will orient to the right hand side thereby avoiding the situation illustrated in FIG. 3 and obtaining reliable optical properties.

To alter the pretilt, one can increase the intensity at which the surface is rubbed (Stohr et al, 'Microscopic Origin of Liquid Crystal Alignment on Rubbed Polymer Surfaces') or use photosensitive alignment materials (Yaroshchuk et al, 'Photoalignment of liquid crystals: basics and current trends') or a mixture of vertical and horizontally aligned LC (Wu et al., 'Controlling pretilt angles of liquid crystal using mixed polyimide alignment layer') or other approaches explained in the literature. Note that it is possible to selectively tune the pretilt angles depending on the position on the lens (e.g., using a photosensitive material), ensuring the absolute tilt angle is the same across the while Fresnel lens.

Another approach is to limit the slopes of the facets. This can be done by using a more aspheric design of a lens for a specific lens power or alternatively, remove the outer parts of the lens half where the slope is higher than the pretilt (e.g., make an oval lens).

Figure 5A:
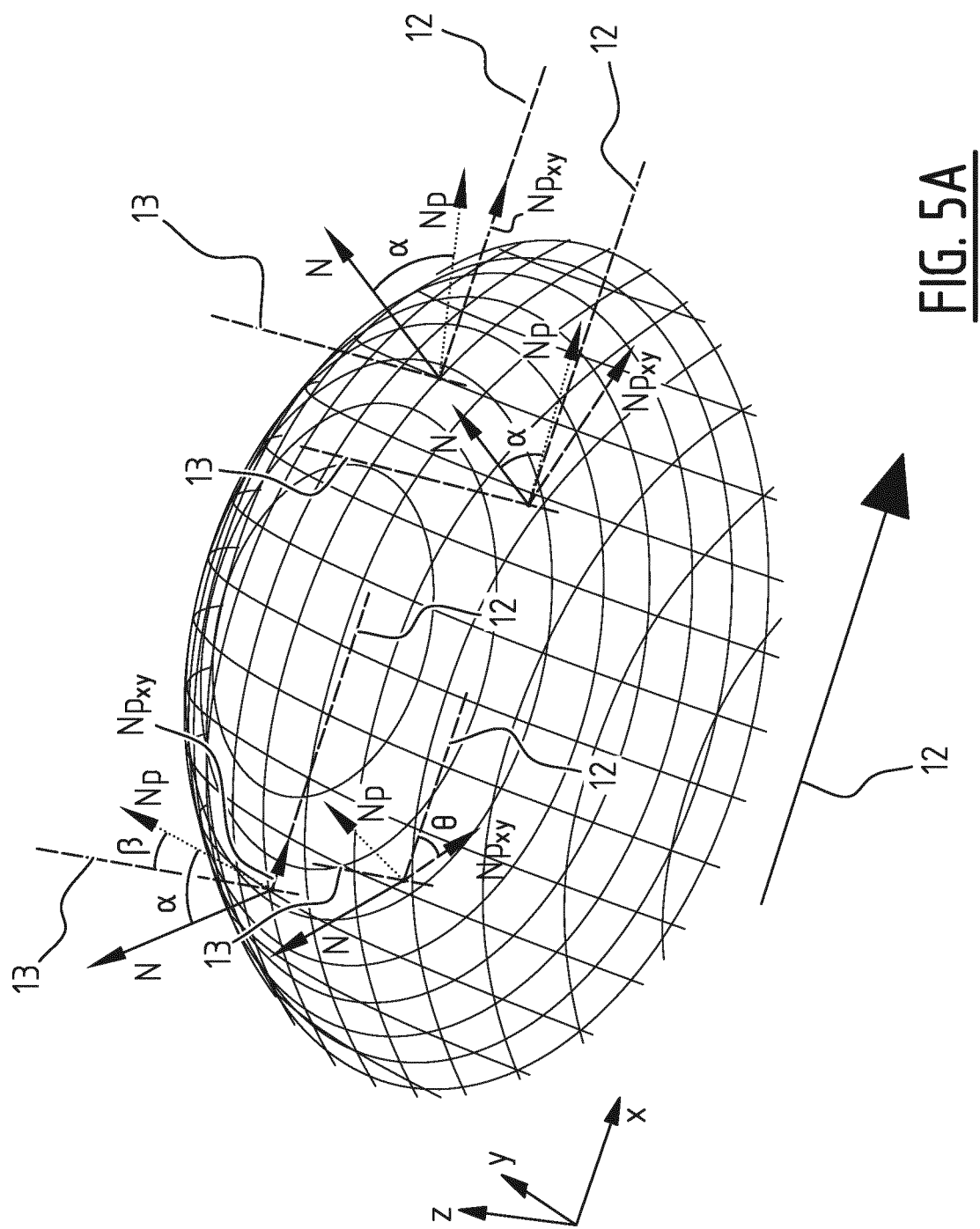
FIG. 5 illustrates views of part of a lens surface wherein the effects of the pre-tilt on the LC molecules is shown at multiple location of the lens surface.

FIG. 5A shows a perspective view of part of a lens surface. This part could be the middle part of a diffractive optical element 4 as described above. In this figure, the surface normal is drawn at multiple locations of the lens surface. This surface normal is drawn as an arrow with an uninterrupted line, and is indicated with reference sign N. The LC orientation in the off-state is, as explained above, a combination of the surface normal and the pre-tilt. The vector showing the LC orientation is also drawn at these multiple locations of the lens surface, and is indicated with reference sign Np. This LC orientation vector is drawn with interrupted dotted line. This LC orientation vector is directly related and intended to illustrate the orientation of the LC molecules in the off state. The pretilt angle is illustrated as angle $\alpha$, being the angle between the surface normal N and the LC orientation vector Np.

The effective tilt angle $\beta$ is defined above as the angle between the surface normal of the first electrode layer and the LC orientation. In FIG. 5, the surface normal of the first electrode layer is shown and indicated with reference sign 13. The effective tilt angle $\beta$ is shown as the angle between the LC molecules and the surface normal 13.

The effective tilt angle $\beta$ is determining for the direction of orientation of the LC molecules when the lens is activated. The effect of the effective tilt angle $\beta$ on the direction of orientation of the LC molecules can be best explained by projecting the LC orientation vector Np onto a surface parallel to the first electrode layer. It is noted that the alignment direction 12 is typically defined parallel to the first electrode layer. Projections of the LC orientation vector Np onto this surface are shown in FIG. 5 and indicated with reference sign Npxy. The projection Npxy comprises a component parallel to the alignment direction 12 and a component transverse to the alignment direction 12. It is noted that the transverse component can be 0, depending on the location on the lens surface. In particular when the sloped surface is not sloped in a direction transverse to the alignment direction, the transverse component of the projection Npxy is 0.

In FIG. 5, an angle $\theta$ is used to illustrate the angle between the projection Npxy and the alignment direction 12. Test have shown that a reliable and predictable operation of the lens device can be guaranteed when, over substantially the whole alignment surface, $\theta$ is smaller than 60 degrees, more preferably smaller than 45 degrees and most preferably smaller than 30 degrees. Based on the explanation above and the corresponding figures, the skilled person will realize that the angle $\theta$ can be made smaller by increasing the pretilt and/or by reducing the slope angles.

Figure 5B:
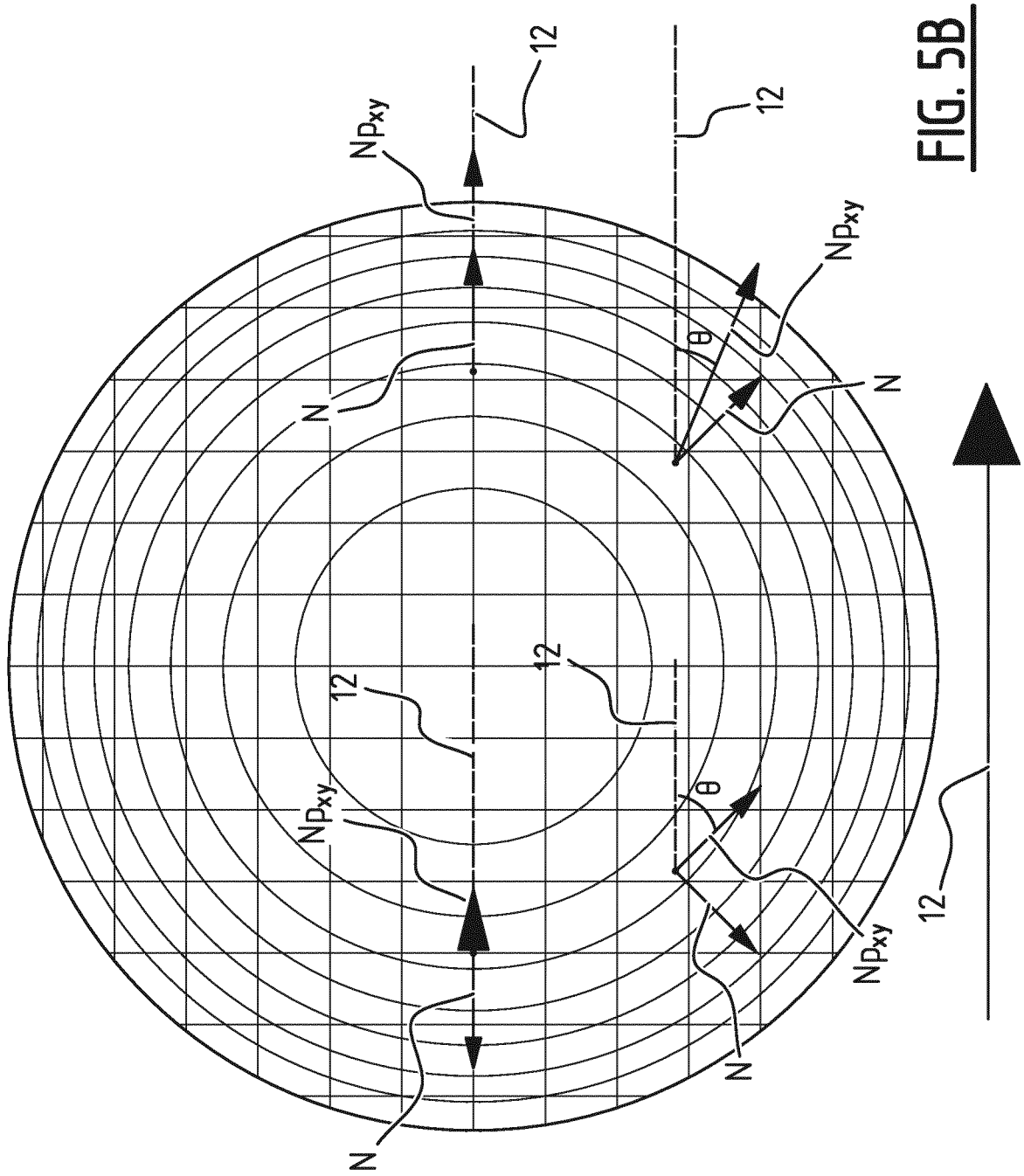
Figure 5C:
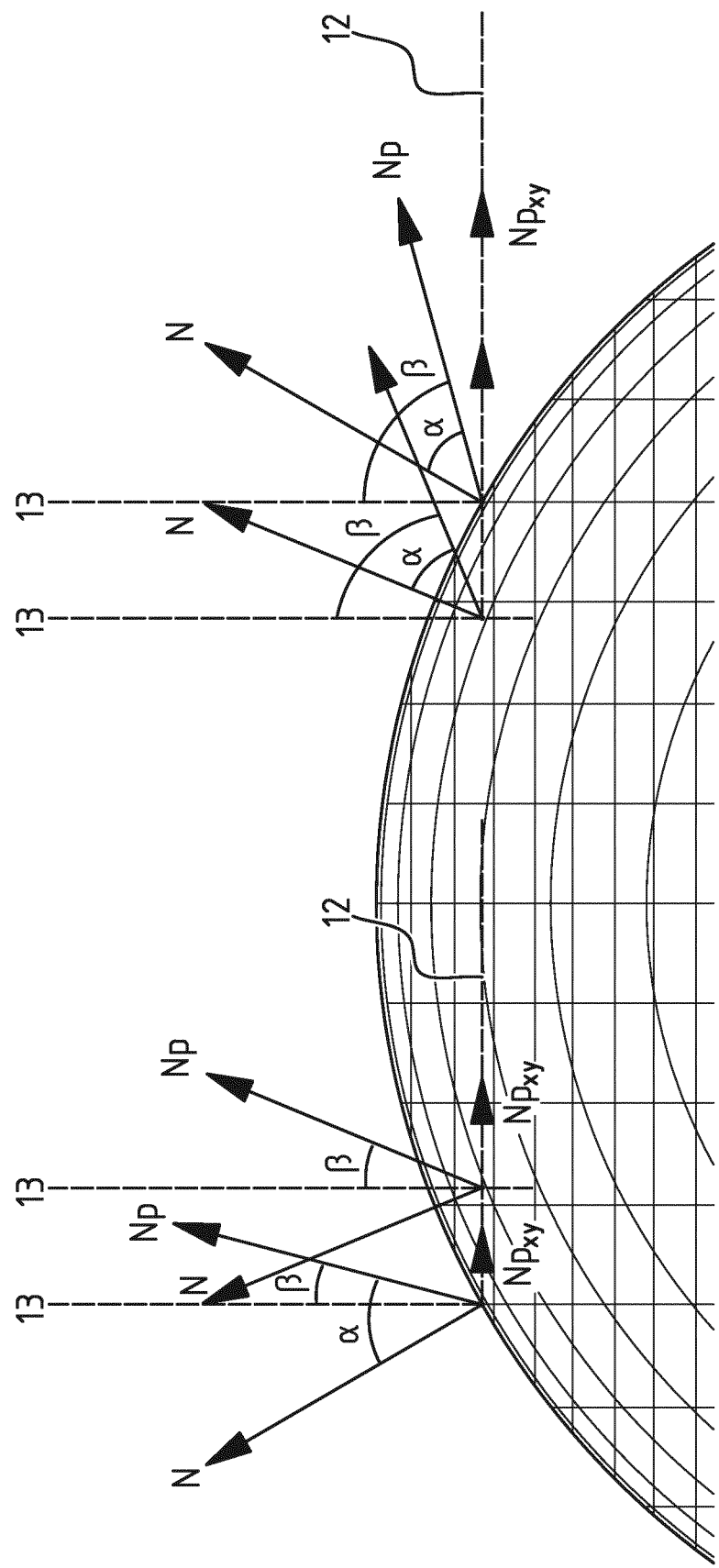

FIG. 5B shows the same lens surface in a top view, parallel to the first electrode layer, and shows the same arrows that are shown in FIG. 5A. Thereby, FIG. 5B shows the projections of the LC molecules on the first electrode layer Npxy. FIG. 5B also shows the surface normal N. In FIG. 5B, the angle $\theta$ can be clearly seen. For the shown projections on the center line of the lens, the angle $\theta$ is 0. For the projections on the bottom of the lens, the angle $\theta$ is about 30 degrees. FIG. 5C shows the same lens surface in a side-view, also showing the same arrows that are shown in FIGS. 5A and 5B. From FIG. 5C, it is clear that the effective tilt angles β are such that all LC orientation vector Np point to the right hand side of the figure. As a result, the LC orientation vectors Np all have a positive vector component in the alignment direction. The skilled person will directly recognize that the effect of these vectors all pointing to the right hand side of the figure is that the LC molecules will orient towards the right hand side when they are activated. This creates a uniform reaction of the LC molecules when activated which is, as described above, advantageous.

Figure 6:
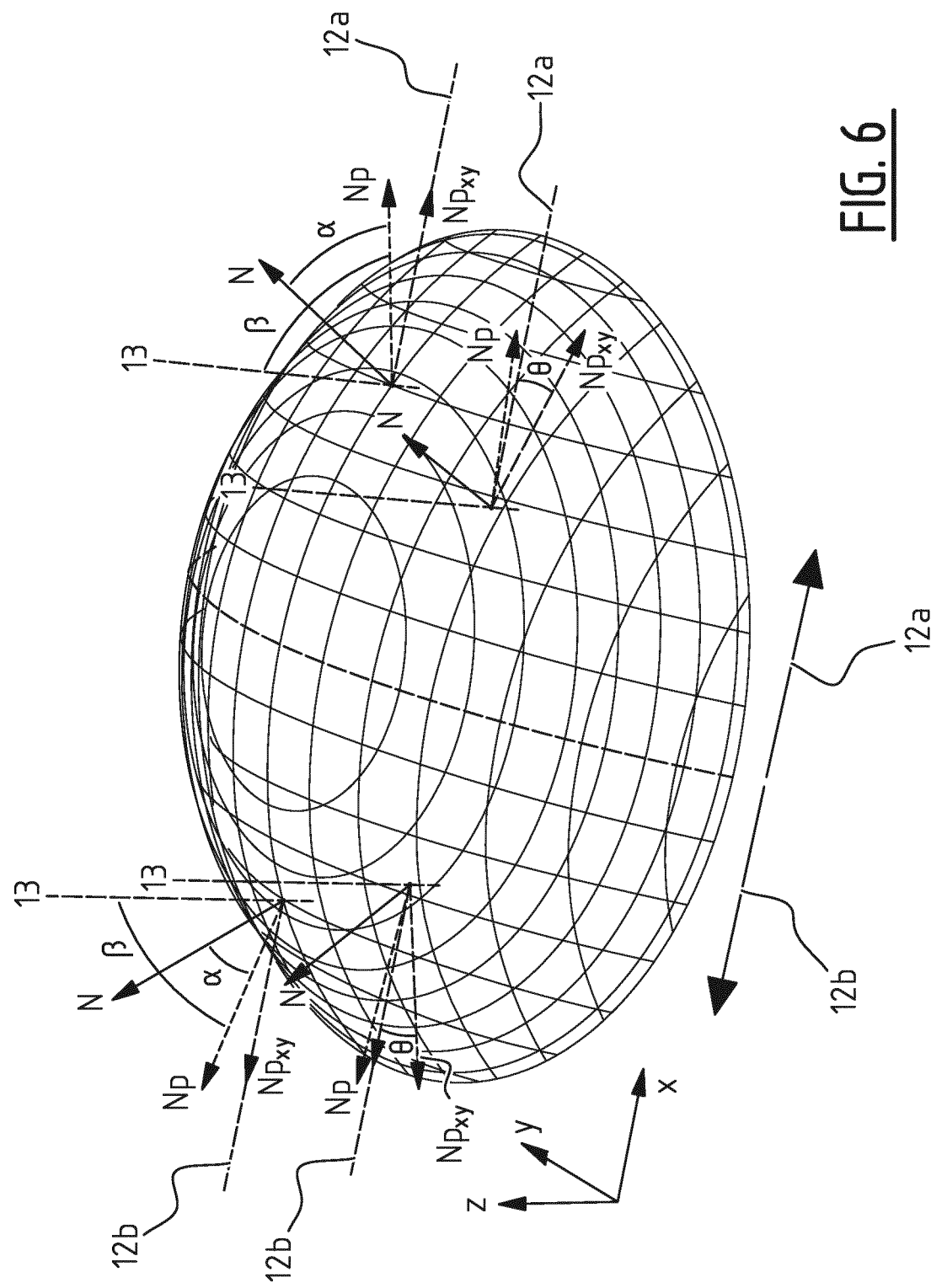
FIG. 6 illustrates a perspective view of a lens surface wherein the surface is segmented and wherein different pre-tilts are applied to the segments.

FIG. 6 shows a figure similar to FIG. 5A, but wherein the lens surface comprises two segments. The arrows in FIG. 6 are analogue to the arrows in FIG. 5, described above. The pretilt is different in the two segments such that the alignment direction of one segment is parallel to and opposite to the alignment direction in the other segment. In particular, the alignment direction 12a, at the right hand side of the lens surface of FIG. 6, points to the right. The alignment direction 12b, at the left hand side of the lens surface of FIG. 6, points to the left. When the LC molecules are activated, the LC molecules on the right hand side of the lens surface will orient to the right while the LC molecules on the left hand side of the lens surface will orient to the left. The effects are described above. The absolute pretilt can be significantly smaller when the lens surface is segmented, to compensate for the slope angle of the lens surface. From FIG. 6, it will be clear to the skilled person that the majority of the surface normal will show at least a vector component in the alignment direction. The pretilt largely aims at compensating for the influence of the vector components in other directions than the alignment direction so that their influence is reduced when activating the LC molecules.

FIG. 7 shows multiple segmentation options for lens surfaces, wherein multiple alignment directions and/or pretilts can be assigned to the multiple segments. In FIG. 7, the arrows illustrate the alignment direction while the interrupted lines illustrate the segmentation of the lens. FIG. 7A shows a lens surface with only a single segment hence having only a single alignment direction. FIG. 7a corresponds with the embodiment shown in FIG. 5. FIG. 7B shows a lens surface with two segments corresponding to the embodiment of FIG. 6. The two segments are provided with opposite alignment directions.

Figure 7A:
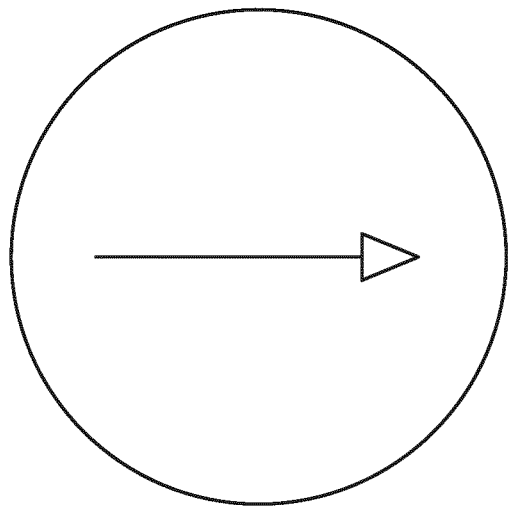
FIG. 7 illustrates multiple options for applying pre-tilt to a lens surface.
Figure 7B:
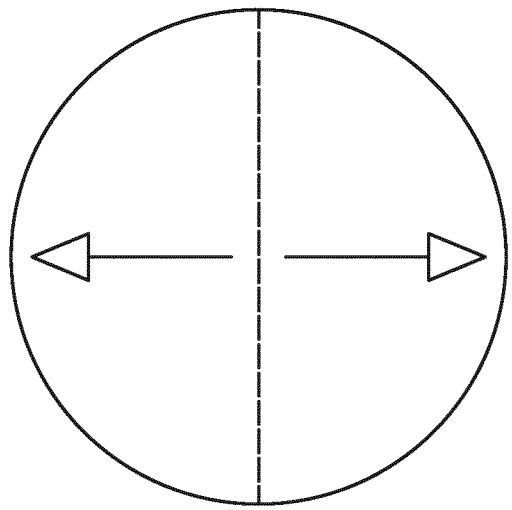
Figure 7C:
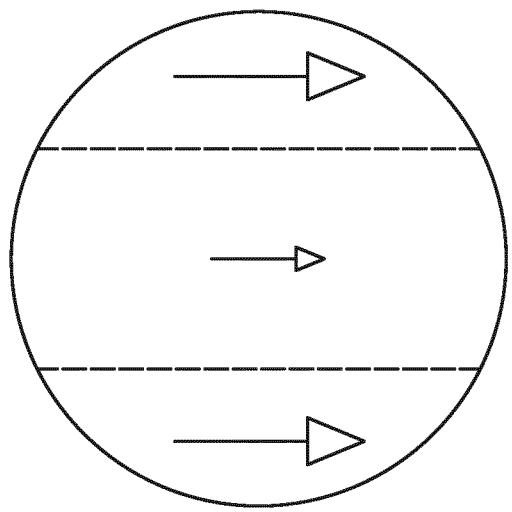

When considering multiple segments in a lens surface, next to two segments with parallel but opposite alignment, other configurations are possible. For instance, in the case of a centro-symmetric diffractive Fresnel lens structure in combination with a liquid crystal having a preferred unidirectional alignment, the molecules in the segments at the side of the lens (see FIGS. 5A and 5B) have the largest transverse component with respect to the alignment direction due to the local slope. To reduce the angle θ, see FIGS. 5 and 6, without affecting the optical quality at the middle of the lens, the outer segments can be provided with a larger pretilt angle. This might come at the expense of worse index matching in the off-state, but will lead to better optical performance in the on-state. The boundary between the inner and the outer segments can have more complex shapes other than a parallel line with the alignment direction and can be designed according to specific desired optical quality measures. Such segmentation is illustrated in FIG. 7C.

Figure 7D:
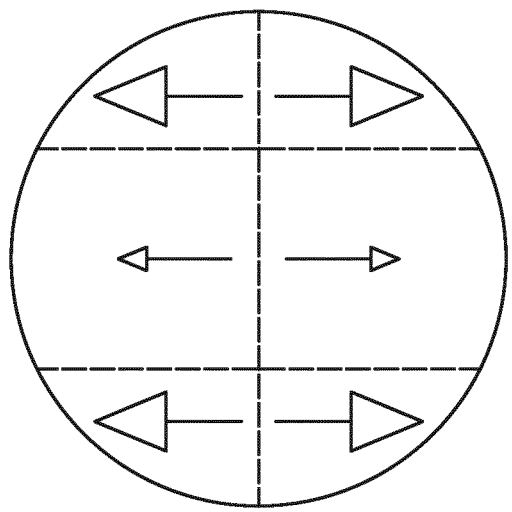

Such a configuration can be even further combined with a central division with parallel, but opposing alignment directions. An example of such configuration is illustrated in FIG. 7D. In this way, a large central disclination line is imposed by design, but the off-axis deviations are minimized at the sides, while the effective tilt angle and the pretilt angle are largely in the same direction.

At the cost of complexity, even more refined segmentation can be implemented, further optimizing the optical quality.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. A polarization independent tunable lens comprising a stack of a first optical device and a second optical device, wherein at least the first optical device comprises:
   a first electrode layer;
   a second electrode layer provided at a distance (d) from the first electrode layer, the first and second electrode layer being light transmitting, and in between of which are present:
      a diffractive optical structure adjacent to the first electrode layer and being a Fresnel lens structure comprising:
         a first sloped surface in a center of the Fresnel lens structure, wherein the first sloped surface has a first slope angle relative to the first electrode layer; and
         a plurality of angular, further sloped surfaces surrounding the first sloped surface, wherein the further sloped surfaces have further slope angles relative to the first electrode layer;
   a first alignment layer covering the first sloped surface and each of the further sloped surfaces;
   a further alignment layer arranged on a side of the second electrode facing the first electrode;
   a liquid crystalline material filling a space between the first alignment layer and the further alignment layer, the liquid crystalline material comprising liquid crystalline (LC)-molecules that are vertically aligned in an off state;
   wherein the first alignment layer is configured to provide LC-molecules at an interface with the first alignment layer with a pretilt (α) in a single alignment direction, the pretilt (α) being the angle between the LC-molecules at the interface, and a normal of the interface;
   wherein for the first sloped surface and the further sloped surfaces the pretilt (α) provided by the first alignment layer is larger than respectively the first slope angle and the further slope angles so as to compensate for respectively the slope angles of the first and further sloped surfaces, and
   wherein, in an on state, the LC-molecules in the space are oriented to align such that projections (Npxy) on the first electrode layer of the LC-molecules (Np) in the liquid crystalline material include an angle (θ) between a projection direction and the single alignment direction within a range from −60 degrees to +60 degrees.

2. The tunable lens of claim 1, wherein the pretilt (α) compensates for the slope by the pretilt being chosen preferably within a range (θ) from −45 degrees to +45 degrees from the single alignment direction, more preferably within a range (θ) from −30 degrees to +30 degrees from the single alignment direction.

3. The tunable lens of claim 1, wherein the pretilt ($\alpha$) is substantially uniform over the first optical device.

4. The tunable lens according to claim 1, wherein: the first alignment layer on a sloped surface is segmented in at least one inner segment and outer segments, the segments being aligned with the single alignment direction, and the outer segments have a pretilt angle ($\alpha$) larger than that of at least one inner segment.

5. The tunable lens according to claim 1, wherein: the angular further sloped surfaces each extend from a blaze protruding from the first electrode layer, the blaze further having a sidewall extending substantially transversal to the first electrode layer, and the first alignment layer is provided according to a predefined pattern such that the sidewalls of the blazes are kept free and remain without the first alignment layer.

6. The tunable lens of claim 1, wherein the first electrode layer extends substantially parallel to the second electrode layer.

7. The tunable lens of claim 1, wherein multiple spacers are provided between the sloped surfaces and the second electrode layer.

8. The tunable lens of claim 1, wherein the second optical device is identical to the first optical device.

9. The tunable lens of claim 1, wherein the second optical device is a polarizer.

10. The tunable lens of claim 1, wherein the first optical device has a dioptric in the range of 0 to +4, and optionally in the range between +0.5 to 3.0 or between +1.0 to 2.5.

11. The tunable lens of claim 1, wherein the first optical device has a diameter of in a range of 15-35 mm, and optionally 20-30 mm.

12. An eyeglass comprising the polarization independent tunable lens as claimed in claim 1.

13. A method of manufacturing a polarization independent tunable lens according to claim 1, the method comprising an application of a pretilt ($\alpha$), such that the LC-molecules at an interface with the fir alignment layer have a pretilt ($\alpha$) in the single alignment direction, which pretilt ($\alpha$) is larger than the fir slope angle and therewith compensates for the first slope angle of the first sloped surface by orienting the LC-molecules to align, in an on state, such that projections ($N_{pxy}$) on the first electrode layer of the LC-molecules ($N_p$) in the liquid crystalline material include an angle transverse to the single alignment direction within a range ($\Theta$) of 60 degrees.

14. The method according to claim 13, wherein the step of providing the pretilt ($\alpha$) comprises rubbing the optical device in the single alignment direction and/or using photosensitive alignment materials.

15. The method as claimed in claim 13, wherein the manufacture of the first optical device comprises the steps of: providing a first substrate with the first electrode layer, the Fresnel lens structure and the first alignment layer; applying the pretilt ($\alpha$) to the first alignment layer in the single alignment direction; providing a second substrate with the second electrode layer and the further alignment layer, and applying a further pretilt to the further alignment layer in a direction anti-parallel to the single alignment direction; and assembling the first and the second substrate and providing liquid crystalline material, such that a space formed upon assembly between the first alignment layer and the further alignment layer is filled up with the liquid crystalline material.

* * * * *